United States Patent [19]

Mutter et al.

[11] 4,103,535
[45] Aug. 1, 1978

[54] METHOD AND APPARATUS FOR EXAMINING ROD-SHAPED ARTICLES

[75] Inventors: Walter F. Mutter; Francis M. Watson, III, both of Richmond, Va.

[73] Assignee: Philip Morris Incorporated, New York, N.Y.

[21] Appl. No.: 821,756

[22] Filed: Aug. 4, 1977

[51] Int. Cl.² ............................................. G01B 13/02
[52] U.S. Cl. .................................. 73/37.5; 131/21 R
[58] Field of Search ..................... 73/37.5, 37.8, 37.9, 73/38, 37.7, 37.6; 131/21 R, 23 R

[56] References Cited

U.S. PATENT DOCUMENTS

| | | | |
|---|---|---|---|
| 2,952,262 | 9/1960 | Pocock et al. | 131/21 |
| 3,585,844 | 6/1971 | Dormseiffen | 73/37.7 |
| 3,593,566 | 7/1971 | Loopuyt | 73/37.7 |

Primary Examiner—Donald O. Woodiel

[57] ABSTRACT

Diverse values of a characteristic of rod-shaped articles, such as circumference dimensions, are stored in a signal-addressable memory connected in read-out manner to display units. An article to be examined is disposed in a pressurized conduit and back pressure from the conduit is sensed and a corresponding output signal is generated. The output signal is converted in a further signal having address indication in predetermined relation to the sensed back pressure indication and identifying the memory location storing corresponding article characteristic value information, whereupon the memory energizes the display unit. This practice is preferably implemented by use of an analog-to-digital converter to affect such predetermined relation between the output signal and such address-indicating further signal.

10 Claims, 5 Drawing Figures

METHOD AND APPARATUS FOR EXAMINING ROD-SHAPED ARTICLES

FIELD OF THE INVENTION

This invention relates to the measurement of characteristics of resilient rod-shaped articles and more particularly to the measurement and display of circumference dimensions of articles such as cigarettes and cigarette filter rods.

BACKGROUND OF THE INVENTION

In the manufacture of cigarettes, a parameter of special interest is cigarette rod circumference dimension, a characteristic directly usable to monitor the degree of uniformity of cross-section of an individual cigarette along its length and variation thereof in batches of cigarettes, and hence to assess whether produced cigarettes meet quality control specifications.

The determination of circumference characteristics of rigid rod-shaped articles, i.e., articles which accommodate contiguous measurement without deformation, poses few problems which are not within the ready capabilities of conventional measurement techniques. For articles insufficiently rigid to be tested as to circumference by such contiguous techniques, the art has turned to non-contiguous testing methods, such as air-gauging techniques, known such methods being noted particularly in the statement filed herein pursuant to 37 C.F.R. 1.97 and 1.98. These techniques are based on the principle that the passage of a given volume of air into a pressure conduit arranged in closely encircling relation to an article will result in a back pressure from the conduit uniquely indicative of the circumference of the article. Thus, pressure fed back to a supply conduit from the article-containing conduit increases with each level of reduction in test conduit volume not occupied by the article, i.e., with each increase in the object size. Such air-gauging practice is non-destructive of the article since it results in minimum surface deformation of the article and thereby allows a high degree of accuracy in circumference measurement.

The manner of displaying dimensional information derived through air-gauging practices is as significant to ultimate output accuracy as the practice itself. Thus, arrangements of air-gauging systems which rely on the use of manometers and like instruments for reading of the back pressure in the supply conduit undermine the accuracy potential of such air-gauging systems. In this respect, manometers are subject to misreading due to parallax and to measurement coarseness even when the finest visible graduations are incorporated. Possible inaccuracy also resides in conduit pressure drops since relatively high supply pressures are required. Accordingly, the art has looked to direct electronic digital display of information derived in air-gauging practices as is discussed in detail in the above-noted statement pursuant to 37 C.F.R. 1.97 and 1.98.

SUMMARY OF THE INVENTION

It is an object of the present invention to provide improved air-gauging practices and systems for the measurement and display of characteristics of resilient rod-shaped articles.

In attaining the foregoing and other objects, the invention provides practice and system wherein each of a plurality of predetermined rod circumference dimensions, or other article characteristic, is stored at a singular memory location having a unique address. An electrical signal is generated having characteristics indicative of back pressure developed in actual testing of a rod and hence corresponding to its circumference dimension. Such generated signal is converted into a further signal having memory address indication corresponding to the address location containing circumference data corresponding to that of the rod actually tested. On being so addressed by such further signal, the memory location applies its stored information to display devices.

In implementing the foregoing practice, the system of the invention includes a test head defining a test conduit for receipt of rods to be tested, a supply conduit for issuing pressurized air into the test conduit, a pressure transducer unit providing an electrical output signal indicative of pressure in the supply conduit, a memory unit for storing predetermined circumference dimensions and having a preselected number of storage locations having distinct digital addresses, and a converter circuit for developing digital signals indicative of such addresses responsively to characteristics of such transducer unit output signals.

The foregoing and other features of the invention will be further understood from the following detailed description of the preferred practice and embodiment of the invention and from the drawings wherein like reference numerals identify like parts throughout.

DETAILED DESCRIPTION OF THE PREFERRED PRACTICE AND EMBODIMENT

Figure 1:
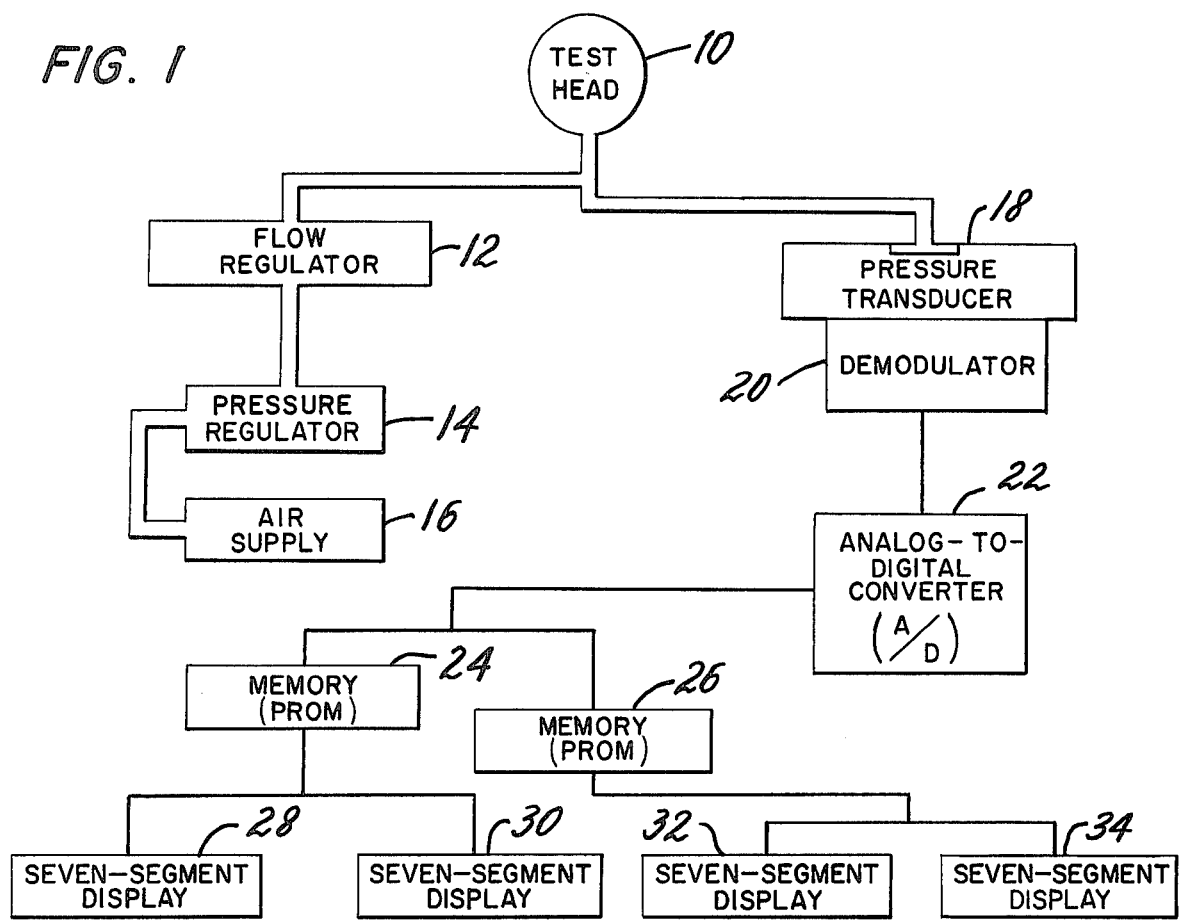
FIG. 1 is a block diagram of a system according with the invention.

Referring to FIG. 1, measurement or test head 10 is adapted for receipt of articles to be examined and is fed with pressurized air by flow regulator 12. Pressure regulator 14 connects flow regulator 12 with pressurized air supply 16. Pressure transducer unit 18 is branch-connected to the pneumatic line extending between head 10 and regulator 12 and accordingly senses pressure in such line. Transducer unit 18 is selected to exhibit linearity in its electrical output voltage over a preselected pressure range input thereto and, where such voltage is alternating-current (a.c.) voltage, demodulator 20 converts the transducer unit output to analog direct-current (d.c.) voltage and furnishes the same to analog-to-digital (A/D) converter 22. The converter digitizes such analog voltage and applies its digital output signals to memory units 24 and 26, each memory unit being a so-called PROM, i.e., a programmable read only memory. PROM 24 services seven-segment display units 28 and 30 and PROM 26 services like display units 32 and 34.

Figure 2:
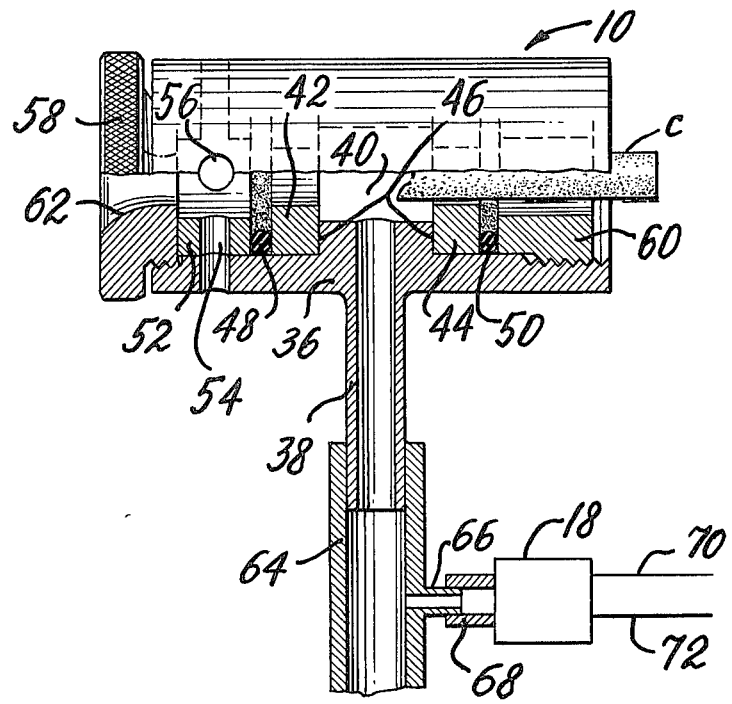
FIG. 2 is a front elevation, partly in section, of a test head for use in the FIG. 1 system.

Turning to FIG. 2, test head 10 includes a tubular casing 36 having a hollow stem portion providing a supply conduit 38 for test conduit 40 defined axially of the test head casing and open at both of its axially spaced ends for receipt and exit of cigarettes C to be tested. Test head rings 42 and 44 are inserted into the cavity into abutting relation with central land 46 of the test head casing. Gaskets 48 and 50 are run up on rings 42 and 44, respectively. Spacer 52 is arranged with its vent passages 54 in registry with vent ports 56 of casing 36 and the assembly of the test head is completed by threading pressure glands 58 and 60 into the casing, respectively into securing relation with spacer 52 and gasket 50. As indicated, gland 58 has interior trumpet configuration surface 62.

Tube 64 is arranged in sealably encircling relation to supply conduit 38 of the casing stem portion and forms a continuation thereof. Outlet branch 66 of tube 64 is sealably encircled by input fitting 68 of transducer unit 18 whereby pressure in tube 64 is sensed by the input diaphragm of the transducer unit. The output voltage of the transducer unit is applied to lines 70 and 72. Pressure transducer unit 18 may comprise a Model #DP7 transducer manufactured by Validyne Engineering, Inc. This commercially-available unit has an operating range of plus or minus one-half p.s.i. and is used in the present application to measure positive pressures of up to one-half p.s.i. Its output is provided as an alternating-current voltage. Demodulator 20 may comprise a Model #CD1014CT demodulator, also manufactured by Validyne. This commercially-available unit converts the transducer output signal to a direct-current voltage of from zero volts (1.86 in. water) to ten volts (10.60 in. water).

Figure 3:
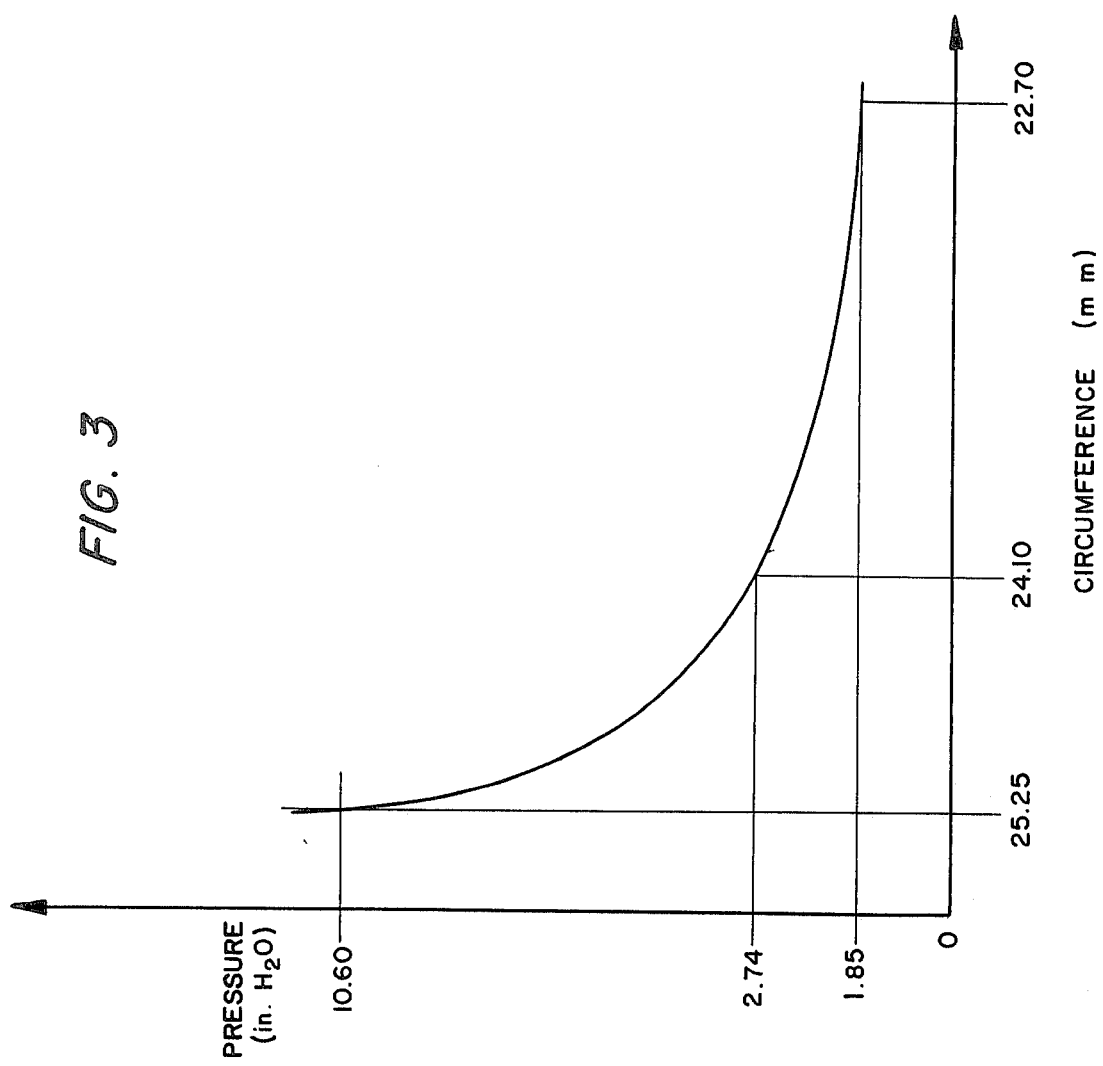
FIG. 3 is a graphical illustration of the relationship between article circumference dimensions and back pressure in the supply conduit of the FIG. 1 system.

FIG. 3 shows a curve interrelating the circumference dimensions of rods with back pressure in inches of water for a given constant air flow. At the extremes of the curve, it is seen that a calibrating rod of 22.70 mm circumference affects a back pressure of 1.85 inches of water and a calibrating rod of 25.25 mm circumference yields a back pressure of 10.60 inches of water. As calibrating rods of dimension intermediate these circumference extremes are examined, e.g., 24.10 mm, data is reached supporting an assumption that the relationship at hand is hyperbolic.

As an alternative to manufacture and examination of calibration rods of graduations in dimension between such extreme circumference dimensions in number, e.g., in excess of two hundred, the hyperbolic relation at hand is preferably computed, as now discussed.

Figure 4:
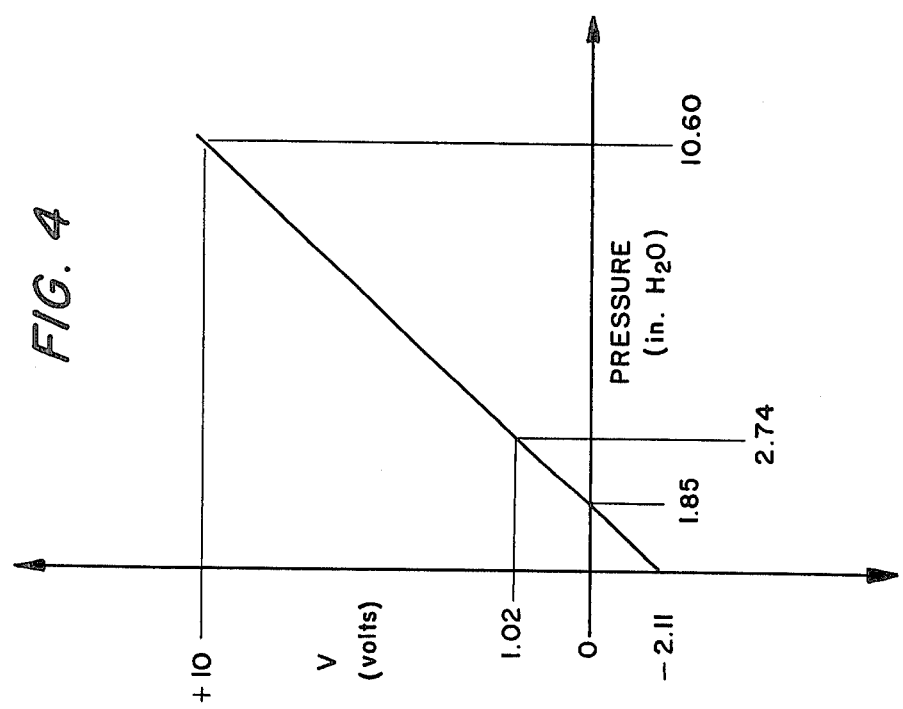
FIG. 4 is a graphical illustration of a fluid pressure-voltage plot useful in understanding determination of stored circumference dimensions.

In FIG. 4, demodulator unit output voltage is shown plotted against pressure, depicting the involved linear relationship therebetween. The demodulator is zeroed, i.e., adjusted to provide zero d.c. output at 1.85 inches of water. The slope of the line is 10 volts (corresponding to 10.60 inches of water) divided by 10.60 less 1.85, or 10/8.75, giving 1.143 and a $y$ intercept (zero inches of water) of $-2.114$. The following linear relationship thus applies:

$$y = [1.143] \cdot x \text{ (inches of water)} - 2.114 \qquad (1)$$

Turning to the hyperbolic relation:

$$(x - h)(y - k) = c \qquad (2)$$

$x$ is now made the independent variable (voltage) and $y$ is the dependent variable (circumference).

With the demodulator zeroed as in FIG. 4, and actual measurement data therein obtained for calibration rods of circumference dimensions 25.25, 24.10 and 22.70 mm, the following three simultaneous equations may be written to compute $h$, $k$ and $c$:

$$(0.00 - h)(22.70 - k) = c \qquad (3)$$

$$(1.03 - h)(24.10 - k) = c \qquad (4)$$

$$(10 - h)(25.25 - k) = c \qquad (5)$$

Solving these equations, one obtains $$h = -1.0545 \qquad (6)$$

$$k = 25.5189 \qquad (7)$$

$$c = 2.9724 \qquad (8)$$

Equation (2), solved for circumference dimension becomes:

$$y = [-2.9724/x + 1.0545)] + 25.5189 \qquad (9)$$

With equation (9), one may compute rod circumference graduations and corresponding voltage change as desired. In accordance with the present invention, one selects the number of such graduations corresponding to the number of memory locations chosen. For example, where 256 memory locations are involved, one computes circumference dimensions ($y$) uniformly incrementally, i.e., for successive voltage ($x$) changes of 0.039216 volt from $x = 0$ to $x = 10$ volts. The respective integer and decimal parts of each such computed $y$ value are entered into corresponding commonly-addressed storage locations of memory units 24 and 26, which are each selected to have such 256 memory locations. As noted in circuitry employed and discussed below in connection with FIG. 5, an eight-bit digital pattern uniquely identifies the $2^8$ locations involved. Thus, the pattern 00000000 identifies a storage location for the $y$ value for $x$ equal to zero, i.e., the circumfernce dimension (22.70 mm) corresponding to zero d.c. demodulator output volts (and hence to back pressure of 1.85 inches of water). Likewise, the pattern 11111111 identifies the storage location for the $y$ value for $x$ equal to 10, i.e., the circumference dimension (25.25 mm) corresponding to ten d.c. volts demodulator output (and hence to back pressure of 10.60 inches of water). For a computed mid-range $y$ value (25.03 mm at $x$ equal to 5.02 volts, back pressure of 6.24 inches of water), the pattern 10000000 will be seen to identify the memory location involved.

In the foregoing example of circumference measurement, calibration and computation, the central aperture diameter of rings 42 and 44 is 0.3285 in., with pressure head at regulator 14 being 0.5 p.s.i. As will be appreciated, difference diameter head rings will enable one to shift to other circumference dimension ranges. Thus, rings of 0.3023 in. central aperture diameter will allow measurements of from 19.90 to 22.45 mm. As in the above-discussed case the range is selected to be 2.56 mm, thereby facilitating use of PROMs having 256 memory locations.

In calibration of the system, a calibration rod of minimum circumference dimension within the range is inserted in the test head and the demodulator output is adjusted until the display units indicate corresponding integer and decimal parts of the calibration rod dimension. The maximum dimension rod is now placed in the test head in place of the previous rod and flow to the supply conduit is adjusted until the display units provide dimensional indication corresponding thereto. These steps are repeated until no further adjustment of demodulator output or flow level is required.

Figure 5:
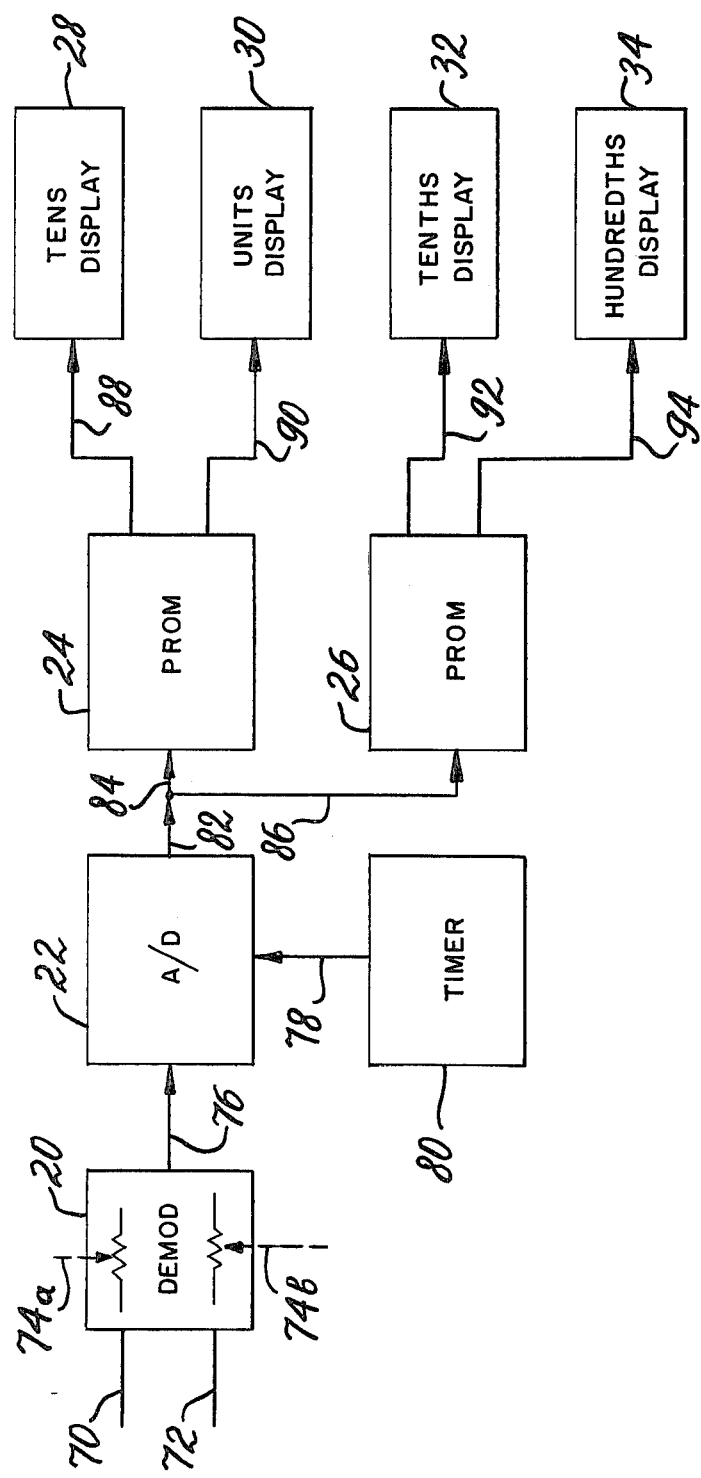
FIG. 5 is an electrical block diagram of a circuit arrangement for the FIG. 1 system.

Referring to FIG. 5, the transducer unit output signal on lines 70 and 72 is applied to demodulator 20 which is equipped with adjusting elements 74a, whereby the demodulator may be zero-set as above-discussed, and 74b for output range scale setting. A/D converter 22 receives the demodulator output over line 76 and may comprise a commercially-available unit, such as ADC-8S manufactured by Analog Devices Incorporated. In use of such commercially-available unit, line 76 is applied to manufacturer-designated (M-D) terminal one of such unit and M-D terminal two is connected to ground. M-D terminals three and five are interconnected. M-D terminal seventeen is connected to −15 volts. M-D terminal eighteen is connected to +15 volts. M-D terminal 20 is connected to +5 volts and M-D terminals 21 and 22 are grounded. A clock signal is furnished on line 78 by timer 80 to M-D terminal 23.

Unit 22 furnishes an 8-bit binary pattern, parallel-outputted from M-D terminals 34 through 41 to lines 82. The remaining terminals of the commercially-available ADC-8S unit are not used. The bit pattern on lines 82 is applied both to input lines 84 of PROM 24 and input lines 86 of PROM 26.

PROMs 24 and 26 may each comprise a commercially-available unit, such as 8702A PROM manufactured by Intel Corporation. Lines 84 and 86 are each applied to M-D terminals one through three and seventeen through twenty-one of the PROMs. PROM M-D terminals 12, 13, 15, 22 and 23 are connected to +5 volts. M-D terminal 14 is grounded and M-D terminals 24 and 16 are connected to −9 volts.

PROM 24 has its output lines connected to display units 28 and 30 by lines 88 and 90. PROM 26 is similarly output-connected to display units 32 and 34 respectively by lines 92 and 94. Lines 88 and 92 are connected to PROM M-D terminals 8 through 11 and PROM output lines 90 and 94 are connected to PROM M-D terminals 4 through 7.

Display units 28 through 34 may comprise identical commercially-available units designated TIL308, manufactured by Texas Instruments Incorporated. M-D terminals 6, 7, 10 and 15 of each of such commercially-available display units are connected to the PROM input lines thereto, 88 through 94. M-D terminals 5 and 8 are grounded. M-D terminals eleven, 13 and 16 are connected to +5 volts. In the case of display units 28, 30 and 34, M-D terminals twelve are grounded. For display unit 32, M-D terminal 12 is connected to +5 volts whereby a decimal point is constantly displayed by unit 32. The remaining M-D terminals of the TIL308 units do not have connections made thereto.

Timer 80 may be comprised of a commercially-available unit designated as NE556 TIMER, manufactured by Signetics Corporation. M-D terminal nine thereof is connected to line 78. Connections are made to this timer unit to provide for continuous clock pulse generation at M-D terminal 9 as follows: M-D terminal 1 is connected to +5 volts through a 10K resistor; M-D terminals 2 and 6 are connected together and further connected through a 2 microfarad capacitor to ground and through a 33K resistor to M-D terminal 1; M-D terminals 3 and 11 are each connected to ground through separate 0.01 microfarad capacitors; M-D terminals 4 and 14 are connected to +5 volts; M-D terminals 5, 8 and 10 are interconnected; M-D terminal 7 is connected to ground; and M-D terminals 12 and 13 are interconnected and further connected to ground through a 0.01 microfarad capacitor and to +5 volts through a 1K resistor.

By way of example of operation of the system described, after such adjustment of demodulator output or flow level as above discussed, assume a test rod of unknown circumference dimension to be disposed in test conduit 40 with rings 42 and 44 of 0.3285 in. central aperture diameter and pressure head at regulator 14 to be 0.5 p.s.i. and the d.c. voltage output of demodulator 20 to be 3.92 volts.

With a 3.92 volt input to converter 22, the eight bit pulse pattern on converter output lines 82 is 01100100, corresponding to 100 increments of the selected voltage step (0.039216 volt) for dimension storage. The information signals (integer part) stored at such address respectively in PROM 24 are indicative of the numerals two and four. The information signals (decimal part) stored at such address respectively in PROM 26 are indicative of the numerals 9 and 2. The resulting display by units 28–34 is 24.92 mm.

As will be seen from the foregoing, the invention complements the accuracy potential of air-gauging measurement of circumference with a highly accurate display and linearization function. While the relationship between back pressure and circumference is non-linear, as shown in FIG. 3, the invention effectively linearizes the same through its assignment of memory locations nonuniformly incremented in circumference information content to address signals which are generated from sensed back pressure. In this connection, the invention relies on the linear relation between back pressure and voltage, as shown in FIG. 4, and, in its illustrated preferred embodiment, relies on analog-to-digital conversion as the intermediary between such transducer output voltage and address signal generation. The invention will accordingly be appreciated as not limited to such preferred conversion practice, but to encompass variations thereof achieving like linearization function.

The invention contemplates the use of feedback apparatus responsive to the signals on lines 88–94 for process control. Thus, these signals may be used for on-line modification of the tobacco maker bed governor to maintain constant rod size.

Various other changes and modifications may be introduced without departing from the invention. Thus, the foregoing description of preferred practices and embodiments is intended in an illustrative and not in a limiting sense. The true spirit and scope of the invention is set forth in the following claims.

What is claimed is:

1. A method for measuring and displaying characteristics of rod-shaped articles, comprising the steps of:
   (a) providing signal-addressable storage locations in preselected number;
   (b) storing separately in said storage locations information signals indicative of diverse values of article characteristics in number equal to said preselected number;
   (c) disposing a rod-shaped article to be examined in a fluid-pressurized conduit;
   (d) generating an output signal indicative of back pressure from said conduit during disposition of said article therein;
   (e) converting said output signal into a further signal having address indication in predetermined relation to such back pressure indication in said output signal whereby such further signal identifies that storage location containing an information signal indicative of the article characteristic value of such examined article; and (f) displaying the value indication in said information signal stored in such storage location identified by said further signal.

2. The method claimed in claim 1 wherein said output signals are analog electrical signals and wherein said step (e) is practiced by converting said analog signals to digital signals.

3. The method claimed in claim 2 wherein said step (a) is practiced by providing digital signal-addressable storage locations.

4. The method claimed in claim 3 wherein said step (a) is practiced by providing plural sets of storage locations, each set having such preselected number of storage locations, corresponding storage locations in each such set having a common address.

5. The method claimed in claim 4 wherein said step (b) is practiced by storing integer and decimal parts of each such diverse article characteristic value respectively in such corresponding storage locations of said plural sets of storage locations.

6. The method claimed in claim 1 wherein such article characteristic is article circumference and wherein said step (b) is practiced by storing circumference dimensions nonuniformly incrementally graduated in value successively in said storage locations.

7. A system for measurement and display of characteristics of rod-shaped articles, comprising:

(a) test head means defining a test conduit for individually receiving rod-shaped articles;
(b) supply means having a supply conduit for issuing pressurized fluid into said test conduit;
(c) transducer means for providing output signals indicative of fluid pressure in said supply conduit on residence of articles in said test conduit;
(d) storage means having signal-addressable storage locations for containing information signals indicative of article characteristics in predetermined diverse values and responsive to address-indicative signals to selectively issue said information signals from said storage locations;
(e) display means for display of article characteristic values indicated in said information signals on issuance thereof from said storage means; and
(f) circuit means for receiving said output signals and generating said address-indicative signals with address indication therein in predetermined relation to the fluid pressure indication in said output signals.

8. The system claimed in claim 7 wherein said output signals are analog signals and wherein said circuit means comprises analog-to-digital converter means.

9. The system claimed in claim 8 wherein said storage means comprises read-only memory having storage locations addressable by digital signals.

10. The system claimed in claim 9 wherein said storage means comprises plural read-only memories containing respective integer and decimal parts of said article characteristic values in commonly-addressable storage locations thereof.

* * * * *

UNITED STATES PATENT AND TRADEMARK OFFICE
CERTIFICATE OF CORRECTION

PATENT NO. : 4,103,535
DATED : August 1, 1978
INVENTOR(S) : Walter F. Mutter and Francis M. Watson, III It is certified that error appears in the above-identified patent and that said Letters Patent are hereby corrected as shown below:

At Col. 4, line 19, Equation (2) should read $$y = \frac{-2.9724}{x + 1.0545} + 25.5189 \qquad (9)$$

At Col. 4, line 54, "difference diameter" should read --different diameter--.

At Col. 8, line 26, (Claim 9), "memory having storage" should read --memory means having storage--.

Signed and Sealed this

Thirteenth Day of March 1979

[SEAL]

Attest:

RUTH C. MASON
*Attesting Officer*

DONALD W. BANNER
*Commissioner of Patents and Trademarks*